Aug. 19, 1969     L. G. TURK ET AL     3,461,502
TIRE CURING PRESS
Filed Oct. 18, 1965     4 Sheets-Sheet 1
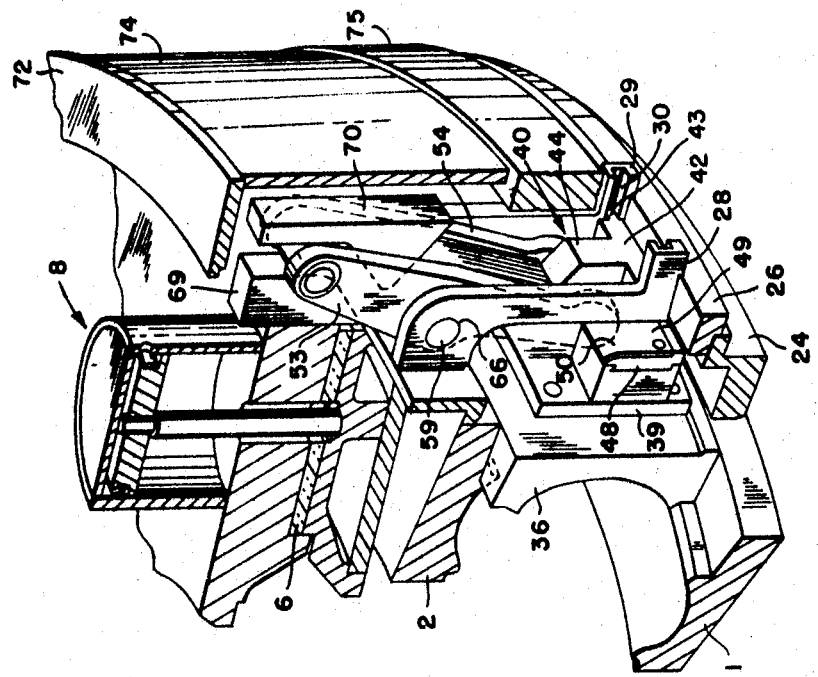
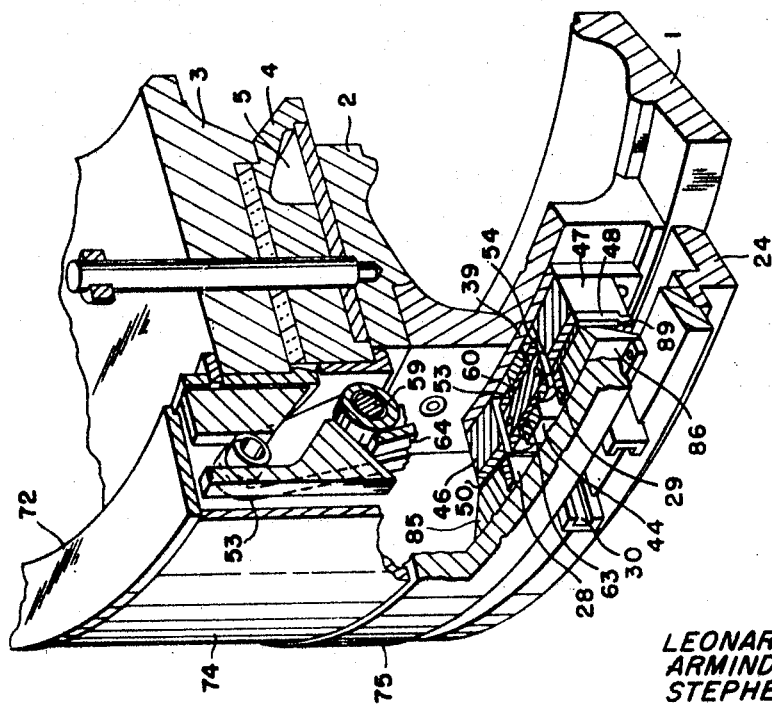
INVENTORS
LEONARD G. TURK
ARMINDO CANTARUTTI
STEPHEN F. BREZA
BY *Oberlin, Maky & Donnelly*
ATTORNEYS

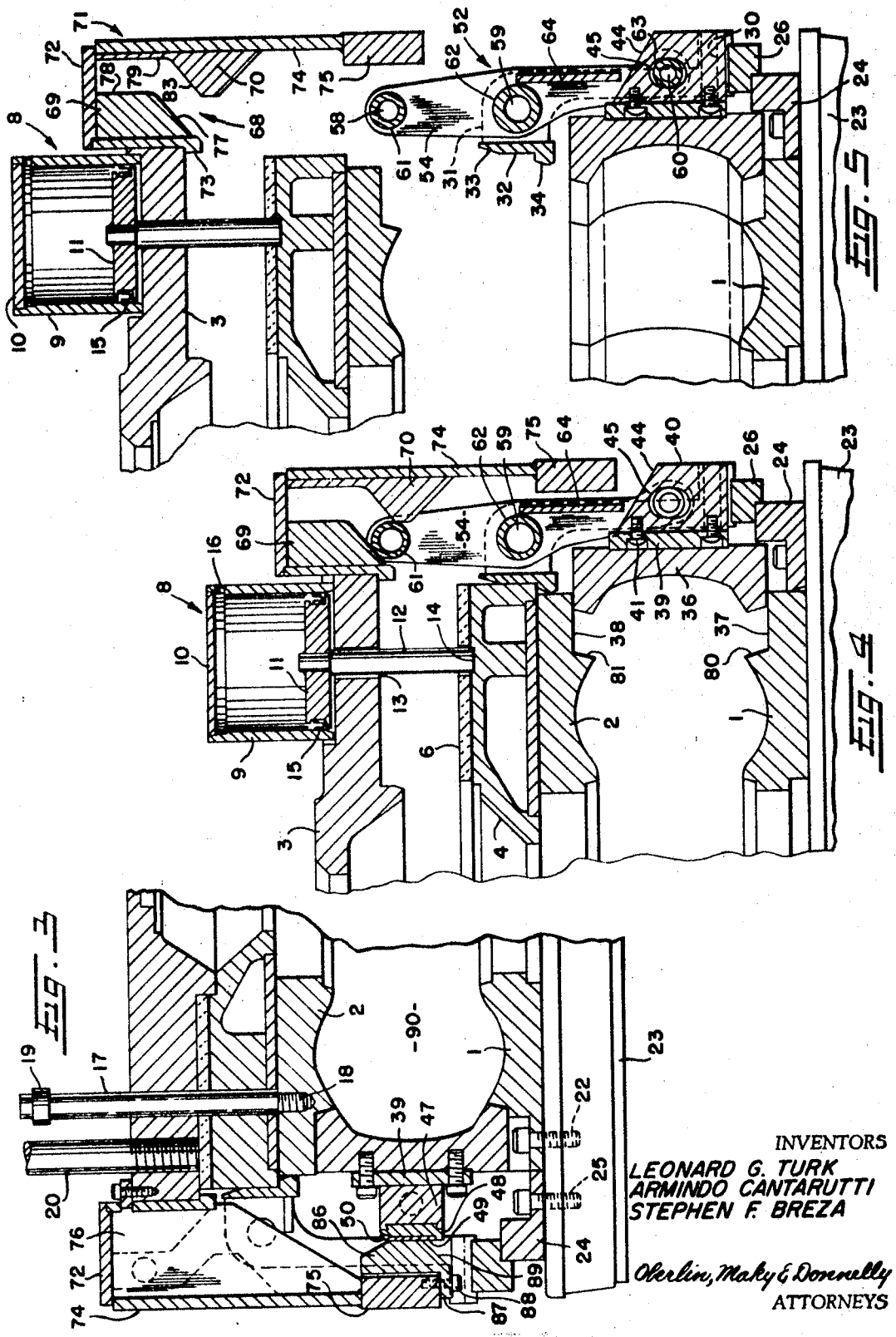

Aug. 19, 1969 L. G. TURK ET AL 3,461,502
TIRE CURING PRESS
Filed Oct. 18, 1965 4 Sheets-Sheet 3

INVENTORS
LEONARD G. TURK
ARMINDO CANTARUTTI
STEPHEN F. BREZA

BY Oberlin, Maky & Donnelly
ATTORNEYS

Aug. 19, 1969    L. G. TURK ET AL    3,461,502
TIRE CURING PRESS
Filed Oct. 18, 1965    4 Sheets-Sheet 4

INVENTORS
LEONARD G. TURK
ARMINDO CANTARUTTI
STEPHEN F. BREZA

BY *Oberlin, Maky & Donnelly*
ATTORNEYS

United States Patent Office
3,461,502
Patented Aug. 19, 1969

3,461,502
TIRE CURING PRESS
Leonard G. Turk and Armindo Cantarutti, Akron, and Stephen F. Breza, Cuyahoga Falls, Ohio, assignors, by mesne assignments, to AMK Subsidiary Corp., Akron, Ohio, a corporation of Ohio
Filed Oct. 18, 1965, Ser. No. 496,930
Int. Cl. B29h 5/02
U.S. Cl. 18—17                                              11 Claims

ABSTRACT OF THE DISCLOSURE

A tire curing press having upper and lower side wall mold sections and radially movable tread mold sections, said tread mold sections being moved by levers intermediately pivoted with the upper projecting ends of the levers engaging vertically movable cam slots, an annular axially movable ring which encloses the tread mold sections, such enclosing of the sections stressing the ring to create a centripetal force on the tread mold sections at least as great as the forces caused by internal curing pressures, and tire detecting means sensing the improper position of the tire as the press closes to initiate a tire straightening cycle.

---

This invention relates generally as indicated to a tire curing press and more particularly to certain improvements in a press for curing radial or conventional tires of the type set forth in the copending application of Armindo Cantarutti, Ser. No. 670,805, filed Sept. 26, 1967, which is a continuation of Ser. No. 399,543, filed Sept. 28, 1964, now abandoned, entitled "Tire Curing Press" and are commonly assigned.

Segmental mold presses used particularly in the vulcanization of radial band tires require for their operation a multiplicity of parts which in the aforementioned copending application include pivoted links. Such links and the pivots thereof in continued operation are subject to wear. This is especially true if the links and the pivots thereof are required to withstand the loads generated by the extremely high vulcanizing pressures of a tire press. Looseness in the pivots may, of course, lead to mold segment separation which in turn can lead to flash problems on the finished tire. It has been found that the high pressures generated by the tire vulcanizing operation may actually warp or distort parts of the press so that the mold segments will not properly concentrically seat and remain in position every time during a vulcanizing cycle.

Furthermore, it has been found that a more simplified segmental mold construction may be provided by mounting the operating linkage on the lower mold section and simply providing the upper mold section with an operating cam to engage and move such linkage as the mold closes. This then does not require that the entire radially movable tread sectors and their operating linkages be carried by the upper mold section.

Shaping detectors have heretofore been utilized in conventional presses which generally comprise a finger or like detector mechanism which is inserted between the mold sections as the press closes. The finger may then detect an overswelling of the tire as the press closes or lack of detection may indicate an underswelling or shaping. However, such detectors have been unable to distinguish between an overshaped tire and one which is simply off-center. Further, since the finger must be removed well prior to the final closing of the press, shaping control cannot be maintained throughout the final shaping portion of the press cycle and it is often times the final closing of the press which is the most critical in tire shaping.

It is accordingly a principal object of the present invention to provide a tire curing press having a tire position control mechanism which can monitor the position of the tire within the press throughout the complete closing of the mold side wall sections.

Another principal object is the provision of a control mechanism for a tire curing press which will monitor the final shaping of the tire within the press as well as the proper centering thereof.

Still another principal object is the provision of a tire curing press having a segmental tread mold portion utilizing a stressed ring to maintain the segments of the mold seated in their closed position throughout the vulcanizing cycle.

A further object is the provision of centripetal mold mechanism wherein the operating linkages for each mold sector are mounted on the lower mold section and are operated by cam means on the upper or movable mold section.

Still another object is the provision of certain improvements in the centripetal mold illustrated and described in the aforementioned copending application.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but one of a few of the various ways in which the principles of the invention may be employed.

In said annexed drawings:

FIG. 1 is a fragmentary isometric partially in section and partially broken away illustrating portions of the operating linkages of the tire press and mold mechanism in closed position;

FIG. 2 is a similar isometric section illustrating more clearly the mounting of the linkages on the lower mold section;

FIG. 3 is a fragmentary radial section of the press illustrating the mold closed;

FIG. 4 is a fragmentary radial section of the press illustrating the side wall sections of the mold together with the tread sectors retracted;

FIG. 5 is a radial fragmentary section similar to FIGS. 3 and 4 illustrating the side wall mold sections separated;

Figure 6:
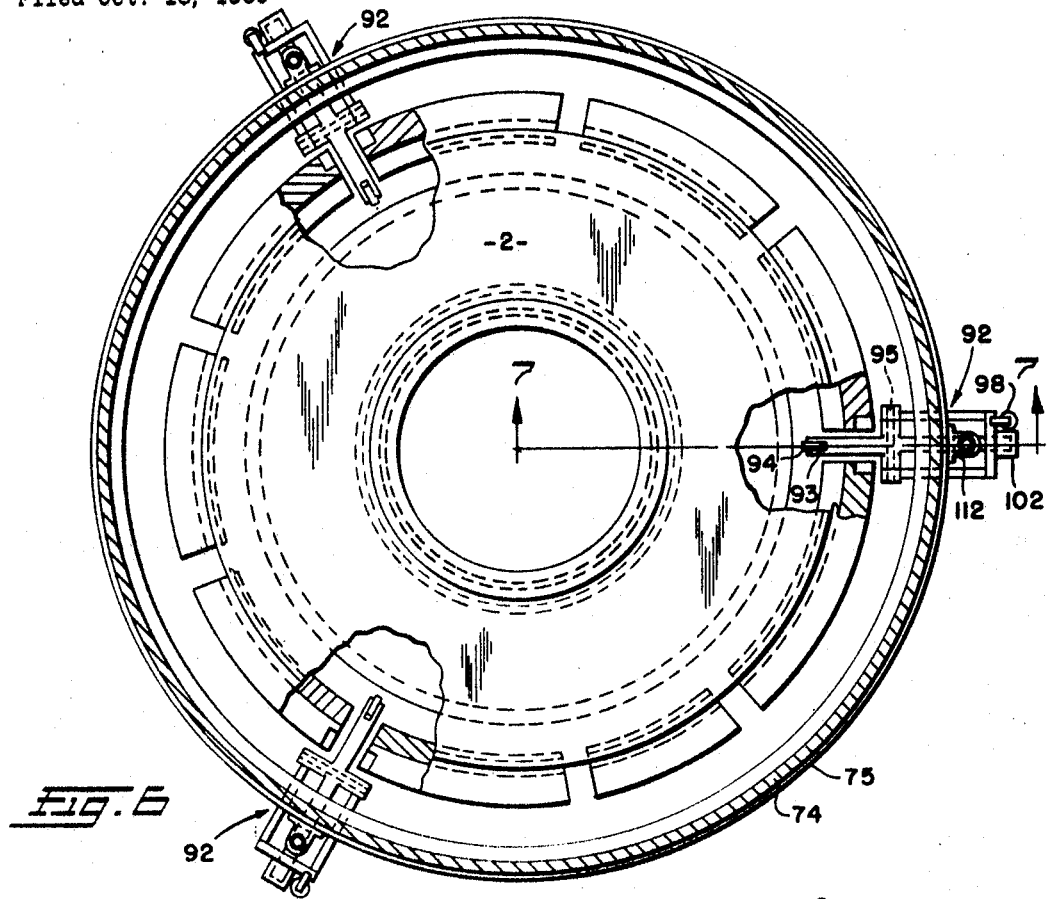
FIG. 6 is a fragmentary horizontal section partially broken away illustrating the position of the shaping and centering detectors.

Referring now to the annexed drawings and more particularly to FIGS. 1 through 5, it will be seen that the press includes a bottom annular side wall mold section 1 which may be stationary and mounted on the bottom portion of the press. Opposed thereto in the closed position of the press is an annular top mold section 2 which may be mounted on the press head. The press head may be mounted for vertical movement with respect to the base or bottom mold section 1 for opening and closing thereof.

The press head also carries an annular bolster 3 which is vertically adjustably secured to such press head. Between the bolster 3 and the top side wall mold section 2 there is provided a fabricated platen 4 which includes chambers 5 therein for the circulation of steam or other heating medium to effect vulcanization of the tire therein. A layer of insulating material 6 is provided on the top of the platen 4 to provide heat insulation between the platen end and the bolster.

The platen 4 and the bolster 3 are engaged by means of piston cylinder assemblies 8 shown more clearly in FIGS. 2, 4 and 5. Each piston cylinder assembly includes a cylinder 9 mounted on the top of the bolster 3 having its upper end closed by plate 10. Piston 11 within each cylinder is connected to rod 12 extending through aperture 13 in the bolster 3. The lower end of the rod of each assembly 8 engages the top platen 4 at 14 and such top platen is in turn firmly secured to the top side wall mold section 2. Sliding seals 15 are provided on the piston 11 providing a sliding fluid seal between the piston 11 and cylinder 9, and the top of each cylinder is provided with a port 16 so that the cylinder may be pressurized urging the piston 11 downwardly and thus the top platen 4 and the top side wall mold section 2 toward its vertically spaced position from the bolster 3 as illustrated in FIGS. 4 and 5. Vertical movement of top side wall mold section with respect to the bolster 3 is limited by stop rods 17 which may be threaded into the top side wall mold section 2 as indicated at 18 in FIG. 3 and the top of such rods is provided with a stop enlargement 19 adapted to engage the top of the bolster 3 when the bolster and top side wall mold sections are in the spaced positions shown in FIGS. 4 and 5. A further stop rod 20 may be secured to the bolster 3 to limit adjustment of the bolster with respect to the press head.

The bottom side wall mold section 1 is secured by suitable fasteners 22 to the base 23 which may include a steam or other heating medium platen adjacent to such bottom side wall mold section. An annular mounting plate 24 is secured to such base outside of the bottom side wall mold section 1 by means of fasteners 25 and a further ring 26 is mounted on the top outside edge of the ring 24.

Secured to the ring 24 are circumferentially spaced pairs of upstanding stanchions shown at 28 and 29 in FIG. 2 which include lower horizontal portions having inwardly directed U-shape ways or guides 30 therein. The top of each stanchion is offset radially inwardly as indicated at 31 and is secured to L-shape fixed ring 32. The interior of the upstanding portion of the L-shape ring 32 is beveled as indicated at 33 to provide a centering pilot portion as is the shorter horizontal portion as shown at 34. The projecting outer edge of platen 4 seats on the shoulder provided by such ring as the press moves from the FIG. 5 to the FIG. 4 position. There will be a pair of such ring supporting stanchions for each tread mold sector of the press. In the illustrated press there may be nine sectors of the tread mold portion of the press although it will be appreciated that more or fewer may be employed.

The tread mold sector is illustrated at 36 and each such sector may be identical in form. Such tread mold sectors are mounted for movement radially between the planar surfaces 37 and 38 of the bottom and top side wall mold sections 1 and 2, respectively, and the back of each sector is provided with a mounting plate 39. A T-block 40 is secured to such mounting plate by fasteners 41 and includes a bottom horizontal portion 42 provided with oppositely extending tongues 43 which fit within the inwardly directed ways 30 in the horizontal bottom portions of the stanchions 28 and 29. The block 40 includes a center upstanding portion 44, more narrow than the bottom portion, which portion 44 is provided with a vertically elongated slot 45.

On each side of and spaced from the center portion 44 of the T-block 40 are bearing blocks 46 and 47 mounted on the plate 39, each of which are provided with inserts 48 on the outer side thereof having a hardened wear plate 49 provided on the outer upper side thereof. As seen more clearly in FIG. 3, the upper edge thereof is slightly beveled as indicated at 50 to provide a pilot guide surface.

Each tread mold sector 36 is operated by a linkage assembly shown generally at 52 which comprises parallel relatively straight links 53 and 54 which are interconnected by pins 58, 59 and 60, reading from top to bottom, having spacers 61, 62 and 63, respectively, thereabout. A stiffening web 64 is also provided interconnecting such links. The lowermost pin 60 and the spacer or bushing 63 thereabout extend through the elongated slot 45 in the web portion 44 of the T-block 40 with the lower ends of the link straddling such portion. The intermediate pin 59 projects beyond the links 53 and 54 and into apertures 66 in the upper elbow of the stanchions 28 and 29. It can now be seen that because of the intermediate fulcrum or pivot 59 horizontal movement of the top of the link assembly 52 will cause the tread mold sectors 36 to be moved radially.

The upper pivot 58 of each linkage assembly 52 is operated by a cam slot 68 formed by complemental cam members 69 and 70 which are radially aligned and secured in annular housing 71 secured to the bolster 3. The housing 71 includes a top ring or plate 72, an inner ring 73 shouldered to the bottom lower annular edge of the bolster 3, and an outer cylindrical wall member 74. A ring 75 of substantial cross-sectional area is secured to the bottom edge of the cylindrical outer wall 74. Web reinforcing plates 76 as seen in FIG. 3 may be secured between the inner and outer walls of the housing 71 to rigidify the same, and such housing may be of weld-fabricated construction. The cam members 69 and 70 for each of the operating linkages 52 may be welded to the interior of the housing 71 and serve also to reinforce such housing.

It can now be seen that the cam members 69 and 70 will straddle the spacer 61 surrounding the upper connecting pin 58 of each linkage assembly 52. The member 69 includes a cam surface 77 which will engage such spacer as the bolster descends moving the top of each assembly radially outwardly. The upper end of the cam members 69 includes a linear surface 78 cooperating with the linear surface 79 of the member 70 to form a vertical slot permitting the press to close fully after the tread sectors have been moved radially inwardly to their closed position and have been seated on the surfaces 80 and 81 of the bottom and top side wall mold sections 1 and 2 as seen, for example, in FIG. 4. The cam member 70 also includes an inclined cam portion 83 which will engage the spacer 61 causing the upper end of the linkage assembly 52 to pivot radially inwardly as the press opens and the bolster 3 moves upwardly. This will cause the linkage to pivot thus to retract the tread mold sectors as the press opens.

Secured to the ring 75 and straddling each pair of stanchions 28 and 29 are pairs of bearing blocks 85 and 86. These blocks as seen in FIG. 3, are provided with a bottom flange 87 which fits beneath the ring 75 and such blocks may be secured to the ring by suitable fasteners 88 extending upwardly through such flange into the ring. The bottom of each block is provided with a cam or bevel surface 89 cooperating with the top beveled or pilot surface 50 on the hardened wear plates 49 on the blocks 46 and 47 which are mounted on the plate 39 secured to the back of each tread mold sector.

As the mold closes to the position shown in FIGS. 1 and 3, the cam or pilot surfaces 89 on the blocks will engage the wear plates 49 on the blocks 46 and 47 actually enlarging the ring 75 stressing the same, and in this manner the ring will be stressed by the mold closing. The stressing of the ring 75 thus creates a circumferential centripetal force equal to or greater than the radial outward forces which will be caused by pressure within the chamber 90 within the tire during vulcanization.

Figure 7:
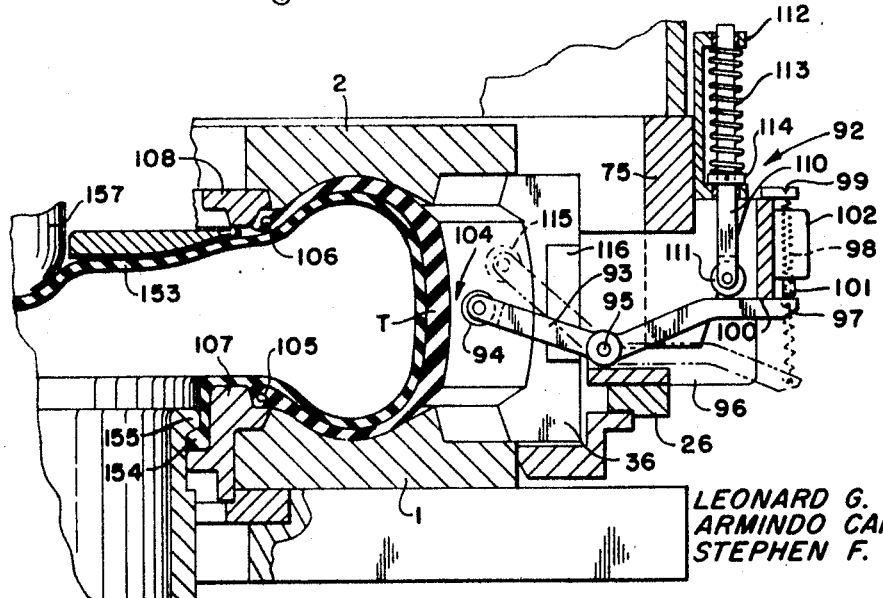
FIG. 7 is an enlarged fragmentary radial section taken substantially on the line 7—7 of FIG. 6 illustrating one form of detector.

Referring now to FIGS. 6 and 7, there is illustrated a tire position sensing mechanism shown generally at 92 and as is evident from FIG. 6, there may be three such sensing assemblies equally spaced about the tire mold. Each sensing assembly may comprise an arm 93 having a roller 94 journalled on the inner end thereof and which is intermediately pivoted at 95 to bracket 96 mounted on ring 26. The rearward or radially outward portion of the arm may be provided with a slight elbow as indicated and the outer end has connected at 97 a tension spring 98 which is connected at 99 to the top of the bracket 96. Such spring will hold the arm 93 in its full length position as seen in FIG. 7 with the arm abutting against the bracket as shown at 100, and in such position the outer upper end of the arm 93 will engage plunger 101 of limit switch 102.

The sensing roller 94 in its full line sensing position thus projects inwardly between adjacent tread sector mold sections 36 to a desired predetermined distance shown at 104 from the tread portion or the periphery of tire T. The roller 94 of each assembly 92 will remain in such position as the top side wall mold section 2 descends to its final shaping position as seen in FIG. 7. Accordingly, if the tire T is projecting radially too far and engages the roller 94, the arm 93 will be pivoted about the pivot 95 against the pressure of spring 98 to trip limit switch 102. Such a sensing signal may indicate that the tire is not being properly shaped or that the beads of the tire shown at 105 and 106 are not in proper registry with the bottom and top toe rings 107 and 108. If the press achieves the final shaping position as seen in FIG. 7 without any of the limit switches 102 of the three assemblies shown being tripped, the press will continue its closing operation moving the tread wall sectors into the final closed position.

A plunger 110 having a roller 111 thereon is mounted for vertical movement in bracket 112 and a compression spring 113 engaging collar 114 secured to the plunger urges the plunger downwardly. The bracket 112 is mounted on the ring 75 which, of course, moves vertically with the press head. As the press continues to close through the final distance moving the tread mold sectors 36 inwardly, the roller 111 will engage the arm 93 pivoting the same to the phantom line position 115 shown. In such retracted position the roller 94 will clear adjacent tread mold sectors which are moving on a converging radial path and a pocket or recess 116 is provided in each of the adjacent tread sectors to accommodate the sensing roller 94 in its retracted position. It will, of course, be appreciated that as the arm 93 moves upwardly and back, the sector 36 moves radially in.

Figure 8:
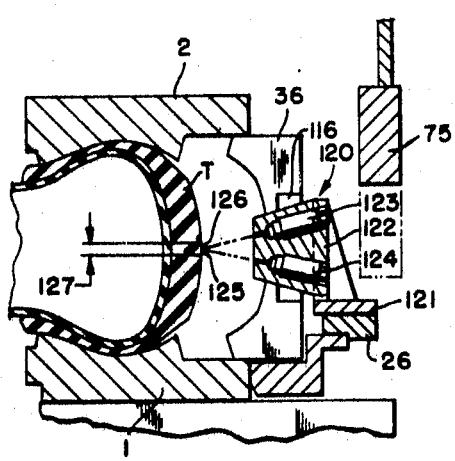
FIG. 8 is a radial section similar to FIG. 7 illustrating a further form of detector.

In FIG. 8 there is illustrated an alternative form of sensing unit which may be generally designated 120 and it may be mounted on fixed bracket 121 on top of the ring 26. The sensing unit 120 comprises a mounting block 122 in which are secured a light source 123 and a receiver 124, the angular relationship of which converges the paths thereof at a predetermined point 125. The source and receiver within the mounting block 122 are symmetrically arranged about a horizontal plane such that the receiver will receive the reflected light from the light source when a band 126 on the tire T is in a predetermined position. If the band and thus the tire is too close or too far from the focal point 125 of the paths of the source and receiver, the light beam will be interrupted and a signal obtained. The band may be of predetermined width as indicated at 127 to afford a shaping or centering tolerance. Again the tread sector 36 may be provided with a recess as indicated at 116 in which the mounting block 122 will nest when the sectors move radially inwardly confining the tire.

Figure 9:
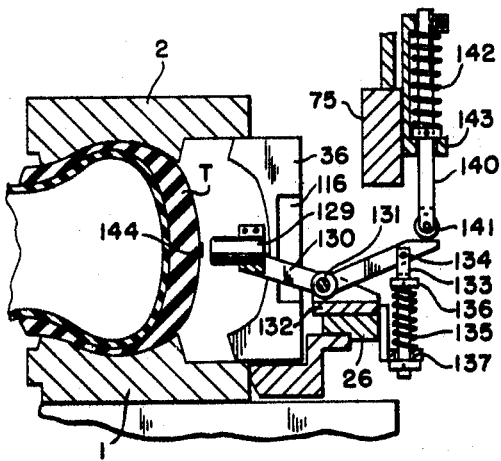
FIG. 9 is a radial section similar to FIGS. 7 and 8 illustrating a still further form of detector.

In FIG. 9 there is illustrated a still further embodiment of a tire centering or sensing mechanism wherein a magnetic transducer 129 is mounted on arm 130 pivoted at 131 to bracket 132 mounted on the ring 26. A plunger 133 is pivoted at 134 to the rear end of the arm 130 and a compression spring 135 extending between collar 136 and bracket 137 urges the plunger to its uppermost position resiliently holding the sensing element 129 in its inward position. A plunger 140 having roller 141 thereon is urged downwardly by compression spring 142 and such plunger is mounted on bracket 143 secured to the ring 75. The magnetic transducer 129 cooperates with a magnetic strip 144 which may be painted on or adhered to the center portion of the tread section of the tire T.

During the period at which a signal is to be taken, the distance from the strip 144 to the magnetic transducer 129 will be determinative of whether or not a signal is given. If the magnetic strip is the proper distance, no signal will be given. Again the tread sector 36 is provided with a recess 116 so that the sensing element 129 will be accommodated in the latter as it is pivoted about the pivot 131 by the vertical downward movement of the plunger 140 as the press moves through its final closing stages and the sector 36 moves inwardly.

Figure 10:
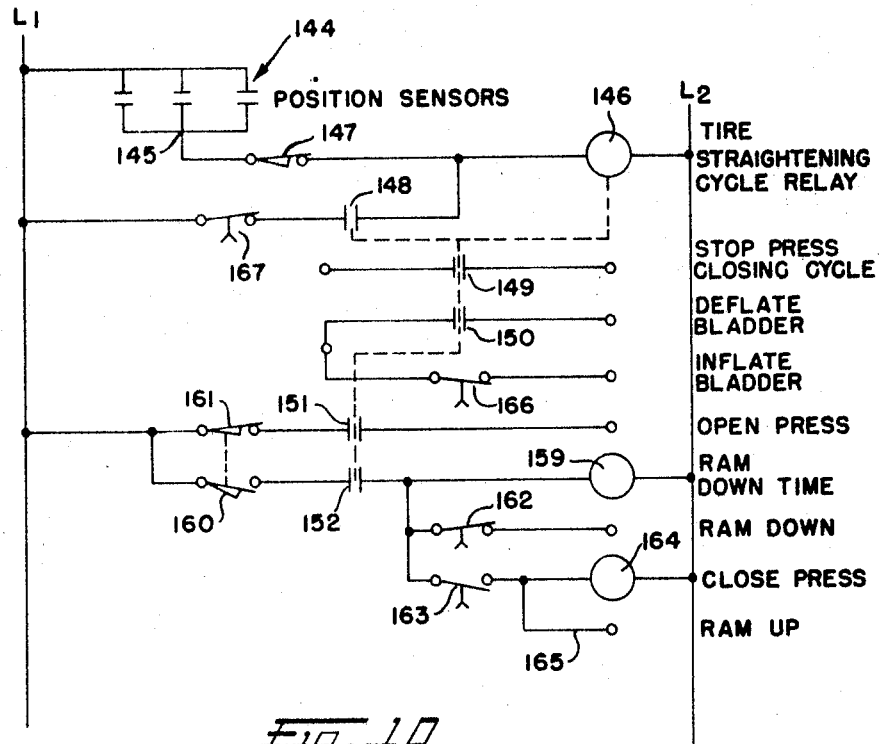
FIG. 10 is a schematic wiring diagram illustrating the function of the detectors as related to the operation of the press.

Referring now to FIGS. 7 and 10, it will be seen that each of the tire position sensors, shown generally at 144, whatever embodiment may be employed, may be wired in parallel and connected at 145 to tire straightening cycle relay 146 through press position cam switch 147. In this manner the circuit interconnecting the tire centering sensors with the tire straightening cycle relay will be prepared and operative only during a certain portion of the closing of the press. Thus if any one of the sensors indicates a tire mispositioned, the relay 146 will be energized closing switches 148, 149, 150, 151 and 152.

The switch 148 serves to hold the relay 146 closed until the completion of the tire straightening cycle. The switch 149 functions to stop the press closing cycle to prevent possible damage to the tire carcass and, of course, a reject tire. The switch 150 serves to deflate the bladder 153 shown more clearly in FIG. 7.

The bladder is provided with an annular bead 154 which may be secured within the recess provided by the top flange 155 of annular well 156 into which the bladder is pushed by ram 157 to strip the bladder from the tire T. The bladder will be caused to be pressurized to swell within the tire carcass as the press closes to provide the normal tire shaping portion of the complete press cycle. Reference may be had to U.S. Patent 3,097,394 to E. E. Mallory et al., entitled "Tire Curing Press" for a more complete disclosure of the construction and operation of a bladder ram.

The relay operated switch 151 functions to open the press to a predetermined position and the switch 152 serves to energize ram downtime delay relay 159 when the press position cam switch 160 is closed. The switch 160 will be closed when the press has reached its predetermined position and the switch 161 will open as the switch 160 closes with the former stopping the press in its predetermined open position. The relay 159 serves to open switch 162 on delay to de-energize the ram-down mechanism, which was energized by the closing of switch 152 with the energization of relay 146. The relay 159 also serves to close switch 163 to energize time delay relay 164 operative to end the tire straightening cycle and close the press. The switch 163 also energizes circuit 165 to elevate the ram. Time delay switch 166 will then be closed causing the bladder to inflate. The time delay relay 164 opens switch 167 in series with the holding switch 148 to de-energize the tire straightening cycle relay 146.

It can thus be seen that the tire position sensors will detect a radially or circumferentially off-center tire and will initiate a corrective control cycle before the final closure of the mold for curing. The corrective control cycle consists of opening the press to a predetermined position, deflating the bladder and extending the ram to a predetermined extent. The ram is then retracted and the bladder re-inflated and this should then correct the position of the tire to permit the press to complete its closing.

The tire position sensors may also be utilized as an aid in the pressure shaping of the tires and makes the illustrated press usable in the shaping of conventional bias angle ply tires. Such tires may start to be shaped at approximately 8 to 10 p.s.i. in the bladder to bring the bladder into the tire and as a conventional press approaches from about 6 to about 8 inches from its closed position, the pressure is dropped to approximately 3 to 5 p.s.i. to ensure that the tread portion of tire will clear the tread portions of the mold. With the present invention the pressure drop to complete closing of the mold may be omitted since the shaping or centering sensors are in position throughout the complete closing of the side wall portions of the mold to complete final shaping. Higher pressures are, of course, used for larger tires, but such pressures may be closely controlled by sensing the tire position upon the complete closing cycle of the side wall portions of the press since the sensors are not removed until the tread sectors are moved radially into position during the final vertical movement of the press head.

It can now be seen that there is provided improvements in a centripetal tire press which enable such press to be used more effectively in the production of both conventional as well as radial band type tires. Moreover, with the simplified operating linkage and the stressed ring, which exerts a constricting radial force equal to or greater than the radial outward forces caused by internal curing pressures, a better quality product will be produced. Further, with the mold construction shown, a shaping or tire centering control mechanism may be nested between two sections of the tread portion of the mold and retracted while the sections close in on the tire to be shaped. In this manner, complete control of the tire position may be had.

Other modes of applying the principles of the invention may be employed, change being made as regards the details described, provided the features stated in any of the following claims or the equivalent of such be employed.

We, therefore, particularly point out and distinctly claim as our invention:

1. A tire curing press comprising a first side wall mold section and a second complementary side wall mold section movable with respect to said first side wall mold section to shape a tire carcass to tire-shape therebetween, a tread mold comprising a plurality of radially movable tread mold sectors operative thereafter to enclose such carcass, detector means operative to sense the position of such carcass as said side wall mold sections are brought together into final shaping position, tire carcass straightening cycle means, means responsive to the improper position of such tire carcass with respect to said detector means operative to initiate said time carcass straightening cycle means, and means operative to retract said detector means as said tread mold sectors are moved radially inwardly.

2. A tire curing press as set forth in claim 3 including means responsive to the relative position of said side wall mold sections to activate said detector means.

3. A tire curing press comprising a first side wall mold section and a second complementary side wall mold section movable with respect to said first side wall mold section to shape a tire carcass to a tire-shape therebetween, a tread mold comprising a plurality of radially movable tread mold sectors operative thereafter to enclose such carcass, detector means operative to sense the position of such carcass as said side wall mold sections are brought together into final shaping position, tire carcass straightening cycle means, means responsive to the improper position of such tire carcass with respect to said detector means operative to initiate said tire carcass straightening cycle means, said press including an inflatable bladder operative to assist in the shaping of such tire carcass and means to strip said bladder from such tire carcass, said tire carcass straightening cycle means being operative to deflate said bladder, open the press, and at least partially to strip the bladder from such tire carcass.

4. A tire curing press as set forth in claim 1 wherein said tire carcass straightening cycle means includes a tire carcass straightening cycle relay, said detector means including at least two sensing elements peripherally spaced about said mold sections and connected in parallel to said relay.

5. A tire curing press as set forth in claim 1 wherein said detector means comprises a lever-actuated limit switch.

6. A tire curing press as set forth in claim 1 wherein said detector means comprises a light source and receiver.

7. A tire curing press as set forth in claim 1 wherein said detector means comprises a magnetic transducer.

8. A tire curing press including a stationary side wall mold section, a vertically movable side wall mold section, a tread mold section including a plurality of radially movable tread sectors which when moved radially inwardly and seated against said side wall mold sections form therewith a continuous annular tire mold, means operative to move said movable side wall mold section with respect to said stationary side wall mold section to form said mold and to open said mold, means operative then to move said sectors radially inwardly to complete formation of said mold and to move said tread mold sectors radially outwardly in opening the mold, an annular ring movable axially and concentrically of said side wall mold sections, and means operative thus to move said ring externally of said tread mold sectors thus to enclose the same with said ring when said sectors are moved radially inwardly causing said ring to engage the radial outer edges of said sectors stressing said ring thereby to create a centripetal force on said sectors at least as great as the forces caused by internal curing pressure.

9. A tire curing press as set forth in claim 8 wherein said last mentioned means includes bearing blocks on each said tread sector, corresponding bearing blocks on said ring, and cooperating surfaces on the bearing blocks on said sectors and ring operative to enlarge and thus stress said ring as said ring encloses said tread sectors.

10. A tire curing press as set forth in claim 8 wherein said means to move the radially movable tread mold sectors includes levers projecting upwardly therefrom, a ring fixed with respect to said stationary side wall mold section above said radially movable tread mold sectors, and fulcrum pivot means connecting said levers to said fixed ring.

11. A tire curing press as set forth in claim 10 including vertically movable cam slot means operative to engage the upwardly projecting ends of said levers to pivot the same about said fulcrum connection to said fixed ring operative to move radially said tread mold sectors.

References Cited

UNITED STATES PATENTS 3,355,077   11/1967   Woodward _____ 228—5

J. HOWARD FLINT, Jr., Primary Examiner

U.S. Cl. X.R.

228—5; 264—315, 326

UNITED STATES PATENT OFFICE
CERTIFICATE OF CORRECTION

Patent No. 3,461,502                          August 19, 19(

Leonard G. Turk et al.

It is certified that error appears in the above identified patent and that said Letters Patent are hereby corrected as shown below:

In the heading to the printed specification, line 5, "AMK Subsidiary Corp." should read -- NRM Corporation --. Column 7, line 58, "time" should read -- tire --.

Signed and sealed this 28th day of April 1970.

(SEAL)
Attest:

Edward M. Fletcher, Jr.                     WILLIAM E. SCHUYLER, JR.
Attesting Officer                              Commissioner of Patents